(12) United States Patent
Gan et al.

(10) Patent No.: US 11,663,823 B2
(45) Date of Patent: May 30, 2023

(54) DUAL-MODALITY RELATION NETWORKS FOR AUDIO-VISUAL EVENT LOCALIZATION

(71) Applicant: International Business Machines Corporation, Armonk, NY (US)

(72) Inventors: Chuang Gan, Cambridge, MA (US); Dakuo Wang, Cambridge, MA (US); Yang Zhang, Cambridge, MA (US); Bo Wu, Cambridge, MA (US); Xiaoxiao Guo, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/989,387

(22) Filed: Aug. 10, 2020

(65) Prior Publication Data
US 2022/0044022 A1 Feb. 10, 2022

(51) Int. Cl.
*G06V 20/40* (2022.01)
*G06N 3/08* (2023.01)
(Continued)

(52) U.S. Cl.
CPC ............. *G06V 20/41* (2022.01); *G06N 3/045* (2023.01); *G06N 3/08* (2013.01); *G06V 20/46* (2022.01); *G10L 25/57* (2013.01); *G06V 20/44* (2022.01)

(58) Field of Classification Search
CPC ........ G06V 20/41; G06V 20/46; G06V 20/44; G06N 3/0454; G06N 3/08; G06N 3/0445; G10L 25/57; G10L 25/30; G10L 25/51
See application file for complete search history.

(56) References Cited

U.S. PATENT DOCUMENTS

| 10,181,325 B2 | 1/2019 | Marcheret et al. |
| 2004/0122675 A1 | 6/2004 | Nefian et al. |

(Continued)

FOREIGN PATENT DOCUMENTS

| CN | 102436483 A | 5/2012 |
| CN | 106503723 A | 3/2017 |

(Continued)

OTHER PUBLICATIONS

Tian, Yapeng, et al. "Audio-visual event localization in unconstrained videos." Proceedings of the European Conference on Computer Vision (ECCV). 2018. (Year: 2018).*

(Continued)

*Primary Examiner* — Sean M Conner
*Assistant Examiner* — Denise G Alfonso
(74) *Attorney, Agent, or Firm* — Scully, Scott, Murphy & Presser, P.C.; Anthony R. Curro

(57) ABSTRACT

Dual-modality relation networks for audio-visual event localization can be provided. A video feed for audio-visual event localization can be received. Based on a combination of extracted audio features and video features of the video feed, informative features and regions in the video feed can be determined by running a first neural network. Based on the informative features and regions in the video feed determined by the first neural network, relation-aware video features can be determined by running a second neural network. Based on the informative features and regions in the video feed, relation-aware audio features can be determined by running a third neural network. A dual-modality representation can be obtained based on the relation-aware video features and the relation-aware audio features by running a fourth neural network. The dual-modality representation can be input to a classifier to identity an audio-visual event in the video feed.

20 Claims, 9 Drawing Sheets

(51) Int. Cl.
   *G10L 25/57*   (2013.01)
   *G06N 3/045*   (2023.01)

(56) References Cited

U.S. PATENT DOCUMENTS

| | | | |
|---|---|---|---|
| 2011/0289033 | A1 | 11/2011 | Gargi et al. |
| 2017/0221483 | A1 | 8/2017 | Poltorak |
| 2017/0236516 | A1 | 8/2017 | Lane |
| 2018/0025729 | A1* | 1/2018 | Marcheret ............... G10L 15/25 382/156 |
| 2021/0174152 | A1 | 6/2021 | Ma |

FOREIGN PATENT DOCUMENTS

| | | |
|---|---|---|
| CN | 108804453 A | 11/2018 |
| CN | 109147763 A | 1/2019 |
| CN | 111292765 A | 6/2020 |
| WO | 2020108396 A1 | 6/2020 |

OTHER PUBLICATIONS

Ramaswamy, Janani, and Sukhendu Das. "See the sound, hear the pixels." Proceedings of the IEEE/CVF Winter Conference on Applications of Computer Vision. 2020. (Year: 2020).*

International Search Report dated Oct. 9, 2021 issued in PCT/CN2021/104443, 9 pages.

Tian, Y., et al., "Audio-Visual Event Localization in Unconstrained Videos", arXiv:1803.08842v1, Mar. 23, 2018, 23 pages.

Owens, "Audio-Visual Scene Analysis with Self-Supervised Multisensory Features", ECCV 2018: Computer Vision—ECCV 2018, Oct. 2018, 18 pages.

Owens, "Visually Indicated Sounds", 2016 IEEE Conference on Computer Vision and Pattern Recognition (CVPR), Jun. 27-30, 2016, pp. 2405-2413.

Anonymous, "Method and Apparatus for Automatically Generating Text-Based Captioning of Complex Events Using Multi-Modality Sensors", An IP.com Prior Art Database Technical Disclosure, IP.com No. IPCOM000255710D, Oct. 11, 2018, 3 pages.

Anonymous, "Method and System for Visual and Audio Analysis on Mobile Devices for Real-Time Cue Generation in Lie Detection", An IP.com Prior Art Database Technical Disclosure, IP.com No. IPCOM000253346D, Mar. 23, 2018, 3 pages.

Anonymous, "Method to Enhance User Interaction with Audio-Visual Multimedia Content and Devices", An IP.com Prior Art Database Technical Disclosure, IP.com No. IPCOM000249193D, Feb. 9, 2017, 4 pages.

Chen, L., et al.,"Sca-cnn: Spatial and channel-wise attention in convolutional networks for image captioning", arXiv:1611.05594v2, Apr. 12, 2017, 9 pages.

Hu, J., et al., "Squeeze-and-Excitation Networks", arXiv:1709.01507v4, May 16, 2019, 13 pages.

Vaswani, A., et al., "Attention is all you need", arXiv:1706.03762v5, Dec. 6, 2017, 15 pages.

* cited by examiner

DUAL-MODALITY RELATION NETWORKS FOR AUDIO-VISUAL EVENT LOCALIZATION

BACKGROUND

The present application relates generally to computers and computer applications, and more particularly to artificial intelligence, machine learning, neural networks, and audio-visual learning and audio-visual event localization.

Event localization is a challenging task for video understanding, which requires a machine to localize events or actions, and recognize the categories in an unconstrained video. Some existing methods take only red-green-blue (RGB) frames or optical flow as input to localize and identify an event. However, due to the strong visual background interference and large visual content variations, it can be difficult to localize events with only visual information.

The audio-visual event (AVE) localization task, which requires a machine to determine the presence of an event that is both audible and visible in a video segment and to what category the event belongs, has attracted increasing attention. The AVE localization task can be challenging due to the following difficulties: 1) complex visual backgrounds in an unconstrained video make it difficult to localize an AVE, and 2) localizing and recognizing an AVE requires the machine to simultaneously consider the information from two modalities (i.e., audio and vision) and exploit their relations. It is nontrivial to build connections between complex visual scenes and intricate sounds. Some methods in this task process two modalities independently, and simply fused them together just before the final classifiers. Existing methods mainly focus on capturing temporal relations among segments within a single modality as potential cues for event localization.

BRIEF SUMMARY

The summary of the disclosure is given to aid understanding of a computer system, computer application, machine learning, neural networks, audio-visual learning and audio-visual event localization, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, computer application, machine learning, neural networks, and/or their method of operation to achieve different effects.

A system and method can be provided, which can implement dual-modality relation networks for audio-visual event localization. The system, in one aspect, can include a hardware processor and a memory coupled with the hardware processor. The hardware processor can be configured to receive a video feed for audio-visual event localization. The hardware processor can also be configured to, based on a combination of extracted audio features and video features of the video feed, determine informative features and regions in the video feed by running a first neural network. The hardware processor can also be configured to, based on the informative features and regions in the video feed determined by the first neural network, determine relation-aware video features by running a second neural network. The hardware processor can also be configured to, based on the informative features and regions in the video feed determined by the first neural network, determine relation-aware audio features by running a third neural network. The hardware processor can also be configured to obtain a dual-modality representation based on the relation-aware video features and the relation-aware audio features by running a fourth neural network. The hardware processor can also be configured to input the dual-modality representation to a classifier to identity an audio-visual event in the video feed.

In another aspect, the system can include a hardware processor and a memory coupled with the hardware processor. The hardware processor can be configured to receive a video feed for audio-visual event localization. The hardware processor can also be configured to, based on a combination of extracted audio features and video features of the video feed, determine informative features and regions in the video feed by running a first neural network. The hardware processor can also be configured to. based on the informative features and regions in the video feed determined by the first neural network, determine relation-aware video features by running a second neural network. The hardware processor can also be configured to, based on the informative features and regions in the video feed determined by the first neural network, determine relation-aware audio features by running a third neural network. The hardware processor can also be configured to obtain a dual-modality representation based on the relation-aware video features and the relation-aware audio features by running a fourth neural network. The hardware processor can also be configured to input the dual-modality representation to a classifier to identity an audio-visual event in the video feed. The hardware processor can be further configured to run a first convolutional neural network with at least a video portion of the video feed to extract the video features.

In yet another aspect, the system can include a hardware processor and a memory coupled with the hardware processor. The hardware processor can be configured to receive a video feed for audio-visual event localization. The hardware processor can also be configured to, based on a combination of extracted audio features and video features of the video feed, determine informative features and regions in the video feed by running a first neural network. The hardware processor can also be configured to. based on the informative features and regions in the video feed determined by the first neural network, determine relation-aware video features by running a second neural network. The hardware processor can also be configured to, based on the informative features and regions in the video feed determined by the first neural network, determine relation-aware audio features by running a third neural network. The hardware processor can also be configured to obtain a dual-modality representation based on the relation-aware video features and the relation-aware audio features by running a fourth neural network. The hardware processor can also be configured to input the dual-modality representation to a classifier to identity an audio-visual event in the video feed. The hardware processor can be further configured to run a second convolution neural network with at least an audio portion of the video feed to extract the audio features.

In still another aspect, the system can include a hardware processor and a memory coupled with the hardware processor. The hardware processor can be configured to receive a video feed for audio-visual event localization. The hardware processor can also be configured to, based on a combination of extracted audio features and video features of the video feed, determine informative features and regions in the video feed by running a first neural network. The hardware processor can also be configured to. based on the informative features and regions in the video feed determined by the first neural network, determine relation-aware video features by running a second neural network. The hardware processor can also be configured to, based on the informative features and regions in the video feed determined by the first neural network, determine relation-aware audio features by running a third neural network. The hardware processor can also be configured to obtain a dual-modality representation based on the relation-aware video features and the relation-aware audio features by running a fourth neural network. The hardware processor can also be configured to input the dual-modality representation to a classifier to identity an audio-visual event in the video feed. The dual-modality representation can be used as a last layer of the classifier in identifying the audio-visual event.

In another aspect, the system can include a hardware processor and a memory coupled with the hardware processor. The hardware processor can be configured to receive a video feed for audio-visual event localization. The hardware processor can also be configured to, based on a combination of extracted audio features and video features of the video feed, determine informative features and regions in the video feed by running a first neural network. The hardware processor can also be configured to. based on the informative features and regions in the video feed determined by the first neural network, determine relation-aware video features by running a second neural network. The hardware processor can also be configured to, based on the informative features and regions in the video feed determined by the first neural network, determine relation-aware audio features by running a third neural network. The hardware processor can also be configured to obtain a dual-modality representation based on the relation-aware video features and the relation-aware audio features by running a fourth neural network. The hardware processor can also be configured to input the dual-modality representation to a classifier to identity an audio-visual event in the video feed. The classifier identifying the audio-visual event in the video feed includes identifying a location in the video feed where the audio-visual event is occurring and a category of the audio-visual event.

In another aspect, the system can include a hardware processor and a memory coupled with the hardware processor. The hardware processor can be configured to receive a video feed for audio-visual event localization. The hardware processor can also be configured to, based on a combination of extracted audio features and video features of the video feed, determine informative features and regions in the video feed by running a first neural network. The hardware processor can also be configured to. based on the informative features and regions in the video feed determined by the first neural network, determine relation-aware video features by running a second neural network. The hardware processor can also be configured to, based on the informative features and regions in the video feed determined by the first neural network, determine relation-aware audio features by running a third neural network. The hardware processor can also be configured to obtain a dual-modality representation based on the relation-aware video features and the relation-aware audio features by running a fourth neural network. The hardware processor can also be configured to input the dual-modality representation to a classifier to identity an audio-visual event in the video feed. The second neural network can take both temporal information in the video features and cross-modality information between the video features and the audio features in determining the relation-aware video features.

In another aspect, the system can include a hardware processor and a memory coupled with the hardware processor. The hardware processor can be configured to receive a video feed for audio-visual event localization. The hardware processor can also be configured to, based on a combination of extracted audio features and video features of the video feed, determine informative features and regions in the video feed by running a first neural network. The hardware processor can also be configured to. based on the informative features and regions in the video feed determined by the first neural network, determine relation-aware video features by running a second neural network. The hardware processor can also be configured to, based on the informative features and regions in the video feed determined by the first neural network, determine relation-aware audio features by running a third neural network. The hardware processor can also be configured to obtain a dual-modality representation based on the relation-aware video features and the relation-aware audio features by running a fourth neural network. The hardware processor can also be configured to input the dual-modality representation to a classifier to identity an audio-visual event in the video feed. The third neural network can take both temporal information in the audio features and cross-modality information between the video features and the audio features in determining the relation-aware audio features.

A method, in one aspect, can include receiving a video feed for audio-visual event localization. The method can also include, based on a combination of extracted audio features and video features of the video feed, determining informative features and regions in the video feed by running a first neural network. The method can also include, based on the informative features and regions in the video feed determined by the first neural network, determining relation-aware video features by running a second neural network. The method can also include, based on the informative features and regions in the video feed determined by the first neural network, determining relation-aware audio features by running a third neural network. The method can also include obtaining a dual-modality representation based on the relation-aware video features and the relation-aware audio features by running a fourth neural network. The method can also include inputting the dual-modality representation to a classifier to identity an audio-visual event in the video feed.

In another aspect, the method can include receiving a video feed for audio-visual event localization. The method can also include, based on a combination of extracted audio features and video features of the video feed, determining informative features and regions in the video feed by running a first neural network. The method can also include, based on the informative features and regions in the video feed determined by the first neural network, determining relation-aware video features by running a second neural network. The method can also include, based on the informative features and regions in the video feed determined by the first neural network, determining relation-aware audio features by running a third neural network. The method can also include obtaining a dual-modality representation based on the relation-aware video features and the relation-aware audio features by running a fourth neural network. The method can also include inputting the dual-modality representation to a classifier to identity an audio-visual event in the video feed. The method can also include running a first convolutional neural network with at least a video portion of the video feed to extract the video features.

In yet another aspect, the method can include receiving a video feed for audio-visual event localization. The method can also include, based on a combination of extracted audio features and video features of the video feed, determining informative features and regions in the video feed by running a first neural network. The method can also include, based on the informative features and regions in the video feed determined by the first neural network, determining relation-aware video features by running a second neural network. The method can also include, based on the informative features and regions in the video feed determined by the first neural network, determining relation-aware audio features by running a third neural network. The method can also include obtaining a dual-modality representation based on the relation-aware video features and the relation-aware audio features by running a fourth neural network. The method can also include inputting the dual-modality representation to a classifier to identity an audio-visual event in the video feed. The method can also include running a second convolution neural network with at least an audio portion of the video feed to extract the audio features.

In still another aspect, the method can include receiving a video feed for audio-visual event localization. The method can also include, based on a combination of extracted audio features and video features of the video feed, determining informative features and regions in the video feed by running a first neural network. The method can also include, based on the informative features and regions in the video feed determined by the first neural network, determining relation-aware video features by running a second neural network. The method can also include, based on the informative features and regions in the video feed determined by the first neural network, determining relation-aware audio features by running a third neural network. The method can also include obtaining a dual-modality representation based on the relation-aware video features and the relation-aware audio features by running a fourth neural network. The method can also include inputting the dual-modality representation to a classifier to identity an audio-visual event in the video feed. The dual-modality representation can be used as a last layer of the classifier in identifying the audio-visual event.

In another aspect, the method can include receiving a video feed for audio-visual event localization. The method can also include, based on a combination of extracted audio features and video features of the video feed, determining informative features and regions in the video feed by running a first neural network. The method can also include, based on the informative features and regions in the video feed determined by the first neural network, determining relation-aware video features by running a second neural network. The method can also include, based on the informative features and regions in the video feed determined by the first neural network, determining relation-aware audio features by running a third neural network. The method can also include obtaining a dual-modality representation based on the relation-aware video features and the relation-aware audio features by running a fourth neural network. The method can also include inputting the dual-modality representation to a classifier to identity an audio-visual event in the video feed. The classifier identifying the audio-visual event in the video feed can include identifying a location in the video feed where the audio-visual event is occurring and a category of the audio-visual event.

In another aspect, the method can include receiving a video feed for audio-visual event localization. The method can also include, based on a combination of extracted audio features and video features of the video feed, determining informative features and regions in the video feed by running a first neural network. The method can also include, based on the informative features and regions in the video feed determined by the first neural network, determining relation-aware video features by running a second neural network. The method can also include, based on the informative features and regions in the video feed determined by the first neural network, determining relation-aware audio features by running a third neural network. The method can also include obtaining a dual-modality representation based on the relation-aware video features and the relation-aware audio features by running a fourth neural network. The method can also include inputting the dual-modality representation to a classifier to identity an audio-visual event in the video feed. The second neural network can take both temporal information in the video features and cross-modality information between the video features and the audio features in determining the relation-aware video features.

In another aspect, the method can include receiving a video feed for audio-visual event localization. The method can also include, based on a combination of extracted audio features and video features of the video feed, determining informative features and regions in the video feed by running a first neural network. The method can also include, based on the informative features and regions in the video feed determined by the first neural network, determining relation-aware video features by running a second neural network. The method can also include, based on the informative features and regions in the video feed determined by the first neural network, determining relation-aware audio features by running a third neural network. The method can also include obtaining a dual-modality representation based on the relation-aware video features and the relation-aware audio features by running a fourth neural network. The method can also include inputting the dual-modality representation to a classifier to identity an audio-visual event in the video feed. The third neural network takes both temporal information in the audio features and cross-modality information between the video features and the audio features in determining the relation-aware audio features.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
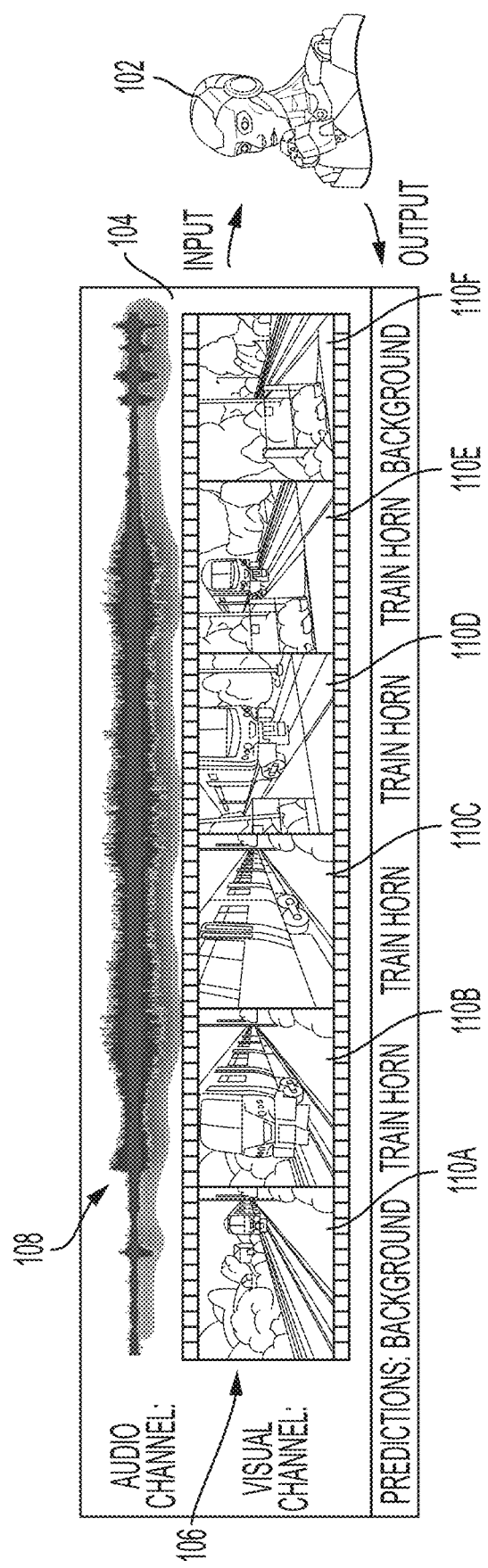
FIG. 1 is an illustrative example of the audio-visual event localization task.

Systems, methods and techniques can be provided, which can, given an untrimmed video sequence with visual and acoustic (audio) channels, identify the presence of an event that is both audible and visual in a video segment and determine to what category the event belongs. For example, a machine can be trained to perform an audio-visual event location. The systems, methods and techniques consider cross-modality or inter-modality relation information between visual scenes and audio signals, in recognizing an audio-visual event in a video sequence.

In an embodiment, a dual-modality relation network is an end-to-end network for performing an audio-visual event localization task, and can include an audio-guided visual attention module, intra-modality relation block, and inter-modality relation block. The audio-guided visual attention module, in an embodiment, serves to highlight informative regions for the reduction of visual background interference. The intra-modality and inter-modality relation blocks, in an embodiment, can separately exploit the intra-modality and inter-modality relation information for the facilitation of presentation learning, for example, for audio-visual representation learning, which facilitates the recognition of an event that is both audible and visible. The dual-modality relation network, in an aspect, may reduce visual background interference by highlighting certain regions and improve the quality of representation of two modalities by considering intra-modality and inter-modality relations as potentially useful information. The dual-modality relation network, in an aspect, enables the capture of the valuable inter-modality relations between visual scenes and sounds, which is mostly unavailable in existing methods. For example, a method in an embodiment can feed the extracted visual and audio features into an audio-guided visual attention module to emphasize informative regions for background interference reduction. The method can prepare intra-modality and inter-modality relation blocks to separately exploit the corresponding relation information for the audio/visual representation learning. The method can incorporate the relation-aware visual and audio features together to obtain a comprehensive dual-modality representation for classifiers.

A machine can be implemented to perform a task of event localization. A machine performing a task of event localization automatically localizes an event and recognizes its category in unconstrained videos. Most existing methods leverage only the visual information of a video while neglecting its audio information. However, reasoning with the visual and audio content simultaneously can be helpful for event localization, for instance, as audio signals often carry useful cues for reasoning. Moreover, the audio information can guide the machine or machine model to pay more attention or focus on the informative regions of visual scenes, which can help to reduce the interference brought by the background. In an embodiment, a relation-aware network leverages both audio and visual information for accurate event localization, for instance, providing technical improvement in machines in recognizing an audio video event in a video stream. In an embodiment, to reduce the interference introduced by the background, the systems, methods, and techniques can implement an audio-guided spatial-channel attention module to guide the model to focus on event-relevant visual regions. The systems, methods, and techniques can also build connections between visual and audio modalities with a relation-aware module. For example, the systems, methods, and techniques learn the representations of video and/or audio segments by aggregating information from the other modality according to the cross-modal relations. Relying on the relation-aware representations, the systems, methods, and techniques can conduct event localization by predicting the event relevant score and classification score. In embodiments, neural networks can be trained to perform event localization in video streams. Various implementations of neural networks operations such as different activation functions and optimizations such as gradient optimizations can be used.

The systems, methods, and techniques consider cross-modality or inter-modality relation information between visual scenes and audio signals, for example, for AVE localization. The cross-modality relation is the audio-visual correlation between audio and video segments. FIG. 1 is an illustrative example of the audio-visual event localization task. In this task in an embodiment, a machine 102 takes as input a video sequence 104 with visual 106 and acoustic channels 108. The machine 102, for instance, includes a hardware processor. The hardware processor, for example, may include components such as programmable logic devices, microcontrollers, memory devices, and/or other hardware components, which may be configured to perform respective tasks described in the present disclosure. The machine 102 is requested to determine whether there exists an event that is both audible and visible in a segment and to what category the event belongs. In an aspect, a challenge is that the machine is required to simultaneously consider information from two modalities and exploit their relations. For example, as shown in FIG. 1, a video sequence can include the sound of a train horn while visualizing a moving train, for example, shown in frame or segment at 110b. This audio-visual correlation suggests an event that is audible and visible. Therefore, cross-modality or inter-modality relations also contribute to the detection of an audio-visual event.

Self-attention mechanism can be used to capture intra-modality relations among words in natural language processing (NLP). It first transforms input features into query, key and value (i.e., memory) features. Then, it calculates the attentive output using a weighted summation over all values in the memory, where the weights (i.e., relations) are learned from the key in the memory and the query. In an aspect, however, in NLP usage, since the query and memory are derived from the same modality, directly applying self-attention to event localization cannot exploit the cross-modality relations between visual and acoustic contents. On the contrary, if the memory acquires features of two modalities, then the query (from one of the two modalities) can enable exploration of the cross-modality relations while not missing the intra-modality relation information.

In an embodiment, the systems, methods and techniques provide a relation-aware module to build connections between visual and audio information by exploiting inter-modality relations. This module, in an embodiment, wraps an attention mechanism called cross-modality relation attention. Different from self-attention, the query is derived from one modality while the keys and values are derived from two modalities in the cross-modality relation attention. In this way, an individual segment from a modality can aggregate useful information from all related segments from two modalities based on the learned intra-modality and inter-modality relations. Simultaneously watching the visual scenes and listening to the sounds (i.e., exploiting information from two modalities simultaneously) can be more effective and efficient than separately perceiving them for localizing an audible and visible event. The systems, methods and techniques, in an aspect, can utilize both useful relations to facilitate representation learning and further boost the performance of AVE localization.

In an embodiment, since the strong visual background interference can obstruct the accurate event localization, the systems, methods and techniques may highlight informative visual regions and features to reduce the interference. For instance, the systems, methods and techniques can include an audio-guided spatial-channel attention module, which leverages audio information to build visual attention at spatial and channel levels. The systems, methods and techniques integrate these components together and provide a cross-modal relation-aware network, which can outperform state-of-the-arts by a margin in supervised and weakly-supervised AVE localization tasks on AVE dataset.

In an embodiment, the systems, methods and techniques can include an Audio-Guided Spatial-Channel Attention module (AGSCA) to leverage the guidance capability of audio signals for visual attention, which can accurately highlight informative features and sounding regions; a relation-aware module to utilize the intra-modality and inter-modality relations for event localization. In an embodiment, a Cross-Modal Relation-Aware Network (also referred to as Dual-Modality Relation Network) can be built for supervised and weakly-supervised AVE localization tasks.

Audio-visual learning can be useful in many domains such as action recognition, sound source localization, and audio-visual event localization. For example, works use audio to build a previewing mechanism to reduce temporal redundancies; a sparse temporal sampling strategy may fuse multiple modalities to boost action recognition; audio may be used as a supervisory signal for learning visual models in an unsupervised manner; a Speech2Face framework may be presented that uses the voice-face correlations to generate facial images behind the voice; to exploit the readily available large-scale unlabelled videos, works leverage audio-visual correspondence to learn audio-visual representations in a self-supervised manner.

Another work for audio-visual event localization uses two long-short term memory (LSTMs) to separately model the temporal dependency of audio and video segment sequences and then fuse audio and visual features simply via additive fusion and average pooling for event category prediction. Yet another work first separately processes audio and visual modalities and then fuses features of two modalities via LSTMs, which works in a sequence-to-sequence manner. Still another work proposes a dual attention matching module, which uses global information obtained by intra-modality relation modeling and local information to measure cross-modality similarity via the inner-product operation. The cross-modality similarity directly serves as a final event relevance prediction. These methods mainly concentrate on leveraging intra-modality relations as potential cues, ignoring the equally valuable cross-modality relation information for event localization. Different from these methods, the systems, methods and techniques in embodiments provide or implement cross-modal relation-aware networks enable bridging connections between visual and audio modalities, for example, by simultaneously exploiting both the intra-modality and inter-modality relation information.

Attention mechanism mimics human visual perception function. It seeks to automatically focus on certain portions of the input that have high activation. Attention mechanism has many variants, including self-attention. Different from self-attention, which focuses on capturing relations within a modality, the systems, methods and techniques, in embodiments, can provide a cross-modality relation attention, which enables simultaneous exploitation of intra-modality and inter-modality relations for audio-visual representation learning.

In the present disclosure, the following notations are used. Let $S=\{S_t=(V_t, A_t)\}_{t=1}^T$ be a video sequence with T non-overlapping segments. Here, Vt and At represent the visual content and its corresponding audio content of the t-th segment, respectively.

For example, FIG. 1 shows segments 110a, 110b, 110c, 110d, 110e, 110f in a video. As shown in FIG. 1 as example, given a video sequence S 104, AVE localization requests a machine to predict the event label (including background) for each segment St relaying on Vt and At. An audio-visual event is defined as an event that is both audible and visible (i.e., hearing a sound emitted by an object and simultaneously seeing the object). If a segment St is not both audible and visible, it should be predicted as background. A challenge in this task is that the machine is required to analyze two modalities and capture their relations. In embodiments, the systems, methods and techniques can use cross-modality relation information to boost performance. In embodiments, this task can be performed in different settings. For instance, in an embodiment, this task can be performed in supervised setting. In another embodiment, this task can be performed in weakly supervised setting. In supervised setting, the systems, methods and techniques can have access to segment-level labels during the training phase. A segment-level label indicates the category (including background) of the corresponding segment. In an embodiment, non-background category labels are given only if the sounds and the corresponding sounding objects are presented. In weakly supervised setting, in an embodiment, the systems, methods and techniques can access only video-level labels during training, and the systems, methods and techniques aim to predict a category for each segment during testing. A video-level label indicates whether a video contains an audio-visual event and to what category the event belongs.

The systems, methods and techniques, in an embodiment, solve a problem that most existing event localization methods neglect the information from the audio signal in a video, which, however, can help to alleviate the interference of complex background and provide more cues for reasoning. A method, for example, leverages both the visual and audio information for event localization and evaluates it on an audio-visual event localization task, which requires the machine to localize an event that is both audible and visible in an untrimmed video. This task is challenging, since an unconstrained video often contains complex backgrounds and it is nontrivial to build connections between complex visual scenes and intricate sounds. To address these challenges, in embodiments, the systems, methods and techniques provide an audio-guided attention module to highlight certain spatial regions and features to reduce background interference. In embodiments, the systems, methods and techniques also devise relation-aware modules to exploit inter-modality relations along with intra-modality relations for localizing an audio-visual event.

Figure 2:
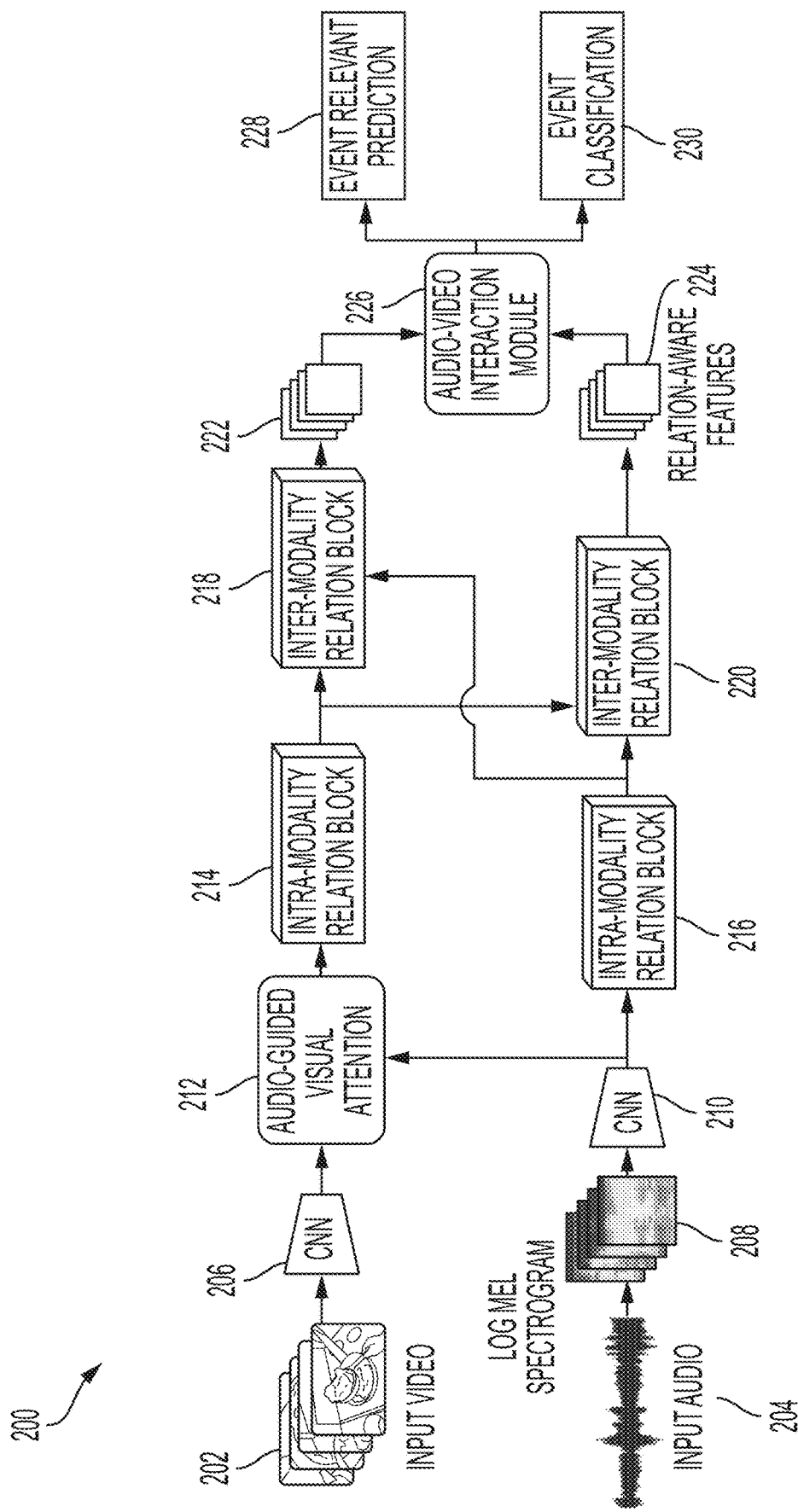
FIG. 2 is a diagram illustrating a dual-modality relation network in an embodiment.

FIG. 2 is a diagram illustrating a dual-modality relation network in an embodiment. The components shown include computer-implemented components, for instance, implemented and/or run on one or more hardware processors, or coupled with one or more hardware processors. One or more hardware processors or processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. A module as used herein can be implemented as software executable on one or more hardware processors, a hardware component, programmable hardware, firmware, or any combinations thereof.

Dual-modality relation network is also referred to as cross-modal relation-aware network. In an embodiment, a dual-modality relation network 200 is an end-to-end network for performing an audio-visual event localization task, and can include an audio-guided visual attention module 212, intra-modality relation block 214, 216, and inter-modality relation block 218, 220. The audio-guided visual attention module 212 can include a neural network (for example, referred to as a first neural network for explanation or illustration). The audio-guided visual attention module 212, in an embodiment, serves to highlight informative regions for the reduction of visual background interference.

The intra-modality and inter-modality relation blocks 214, 216, 218, 220, in an embodiment, can separately exploit the intra-modality and inter-modality relation information for the facilitation of presentation learning, for example, for audio-visual representation learning, which facilitates the recognition of an event that is both audible and visible. The intra-modality and inter-modality relation blocks 214, 218 can include a neural network (for example, referred to as a second neural network for explanation). The intra-modality and inter-modality relation blocks 216, 220 can include a neural network (for example, referred to as a third neural network for explanation). The dual-modality relation network 200, in an aspect, may reduce visual background interference by highlighting certain regions and improve the quality of representation of two modalities by exploiting intra-modality and inter-modality relations as potentially useful information. The dual-modality relation network, in an aspect, enables the capture of the valuable inter-modality relations between visual scenes 202 and sounds 204.

For example, a method in an embodiment can feed the extracted visual and audio features into an audio-guided visual attention module 212 to emphasize informative regions for background interference reduction. For instance, video features fed into the audio-guided visual attention module 212 can be extracted by inputting input video 202 to a convolutional neural network 206, for example, trained to extract the video features. Input audio 204 can be processed using log mel spectrogram representation 208, which can be input to a convolutional neural network 210, trained to extract audio features, to extract the audio features for feeding into the audio-guided visual attention module 212. Input video 202 and input audio 204 are components of a video feed, stream or sequence. The method can prepare intra-modality and inter-modality relation blocks 214, 216, 218, 220 to separately exploit the corresponding relation information for the audio/visual representation learning. For example, the intra-modality relation block 214 and inter-modality relation block 218 generate relation-aware features 222; the intra-modality relation block 216 and inter-modality relation block 220 generate relation-aware features 224. An audio-video interaction module 226 can incorporate the relation-aware visual and audio features 222, 224 together to obtain a comprehensive dual-modality representation for classifiers. The audio-video interaction module 226 can include a neural network (for example, referred to as a fourth neural network for explanation). A comprehensive dual-modality representation output by the audio-video interaction module 226 can be fed into a classifier (e.g., a neural network) for event classification 230 and/or event relevant prediction 228.

By way of example, input AVE dataset (e.g., video and audio input 202, 204) can contain videos covering a wide scope of domain events (e.g., human activities, animal activities, music performances, and vehicle sounds). The events can involve diverse categories (e.g., church bell, crying, dog barking, frying food, playing violin, and/or others). By way of example, a video can contain one event and can be divided into a number of time interval segments (e.g., ten one-second segments), for processing by the dual-modality relation network. In an embodiment, the video and audio scenes (e.g., video and audio input 202, 204) in a video sequence are aligned. In another embodiment, the video and audio scenes (e.g., video and audio input 202, 204) in a video sequence need not be aligned.

By way of example, a CNN 206, can be a convolutional neural network such as, but not limited to, VGG-19, residual neural network (e.g., ResNet-151), and can be pretrained, for example, on ImageNet as visual feature extractors. For example, 16 frames can be selected within each segment as input. As an example, the output of the pool5 layer in VGG-19 with dimensions of 7×7×512 can be taken as the visual features. For ResNet-151, the output of the conv5 layer with dimensions of 7×7×2048 can be taken as visual features. The frame-level features within each segment can be averaged temporally as segment-level features.

By way of example, input audio 204, which can be raw audio, can be transformed into log mel spectrograms 208. The method and/or system can, for example, extract acoustic features with dimensions of 128 for each segment using a VGG-like network pretrained on AudioSet.

Figure 3:
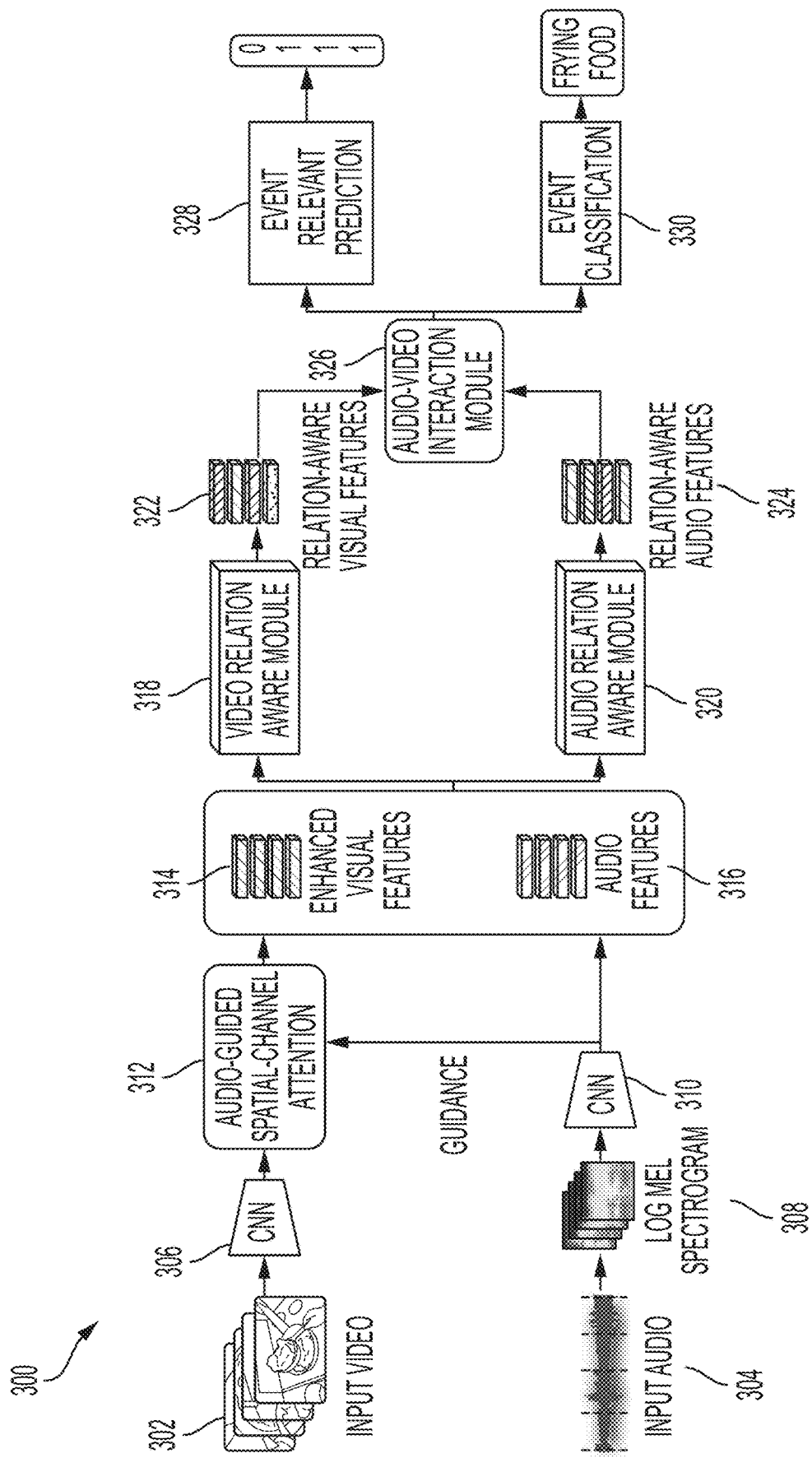
FIG. 3 is another diagram showing a dual-modality relation network in an embodiment.

FIG. 3 is another diagram showing a dual-modality relation network in an embodiment. The components shown include computer-implemented components, for instance, implemented and/or run on one or more hardware processors, or coupled with one or more hardware processors. One or more hardware processors or processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. A module as used herein can be implemented as software executable on one or more hardware processors, a hardware component, programmable hardware, firmware, or any combinations thereof.

The dual-modality relation network is also referred to as a cross-modal relation-aware network (CMRAN). Input video 302 is fed or input to a convolutional neural network (CNN) 306, for example, trained to extract the video features. Input audio 304 can be processed using log mel spectrogram representation 308, which can be input to a convolutional neural network (CNN) 310, trained to extract the audio features, to extract the audio features for feeding into the audio-guided spatial-channel attention module (AGSCA) (e.g., referred to in FIG. 2 also as audio-guided visual attention module) 312. Using the extract video features from the CNN 306 and audio features from the CNN 310, the audio-guided spatial-channel attention module (AGSCA) (e.g., referred to in FIG. 2 also as audio-guided visual attention module) 312 serves to leverage audio information (e.g., output by the CNN 310) to guide visual attention at spatial and channel levels (e.g., video channel), producing enhanced visual features 314. The CNN 310 extracts audio features 316. Two relation-aware modules 318, 320 capture both intra-modality relations and inter-modality relations for two modalities (video and audio) separately, producing relation-aware visual features 322 and relation-aware audio features 324. Cross-modal relation-aware visual features 322 and cross-modal relation-aware audio features 324 are incorporated together via an audio-video interaction module 326, yielding a joint dual-modality representation, which can be input to a classifier for event relevant prediction 328 and/or event classification 330.

Given a video sequence S, a method and/or system, for example, forwards each audio-visual pair $\{V_t, A_t\}$ 302, 304 through pretrained CNN backbones 306, 308 to extract segment-level features $v_t, a_{t=1}^T$. The method and/or system forwards audio and visual features through the AGSCA module 312, to obtain enhanced visual features 314. With audio features 316 and enhanced visual features 314, the method and/or system prepares two relation-aware modules, video relation-aware module 318 and audio relation-aware module 320, which wrap a cross-modality or dual-modality relation attention separately for audio and visual features. The method and/or system feeds visual and audio features 314, 316 into the relation-aware modules 318, 320 to exploit both relations for two modalities. The relation-aware visual and audio features 322, 324 are fed into the audio-video interaction module 326, yielding a comprehensive joint dual-modality representation for one or more event classifiers 330 or prediction 328.

Audio-Guided Spatial-Channel Attention

Audio signals are capable of guiding visual modeling. The channel attention enables to discard irrelevant features and to improve the quality of visual representations. The audio-guided spatial-channel attention module (AGSCA) 312, in an embodiment seeks to make the best of the audio guidance capability for visual modeling. In an aspect, rather than having audio features only participate in visual attention in the spatial dimension, the AGSCA 312, in an embodiment, exploits audio signals to guide visual attention in both spatial and channel dimensions, which emphasizes informative features and spatial regions to boost the localization accuracy. A known method or technique can be used to perform channel and spatial attention sequentially.

Figure 4:
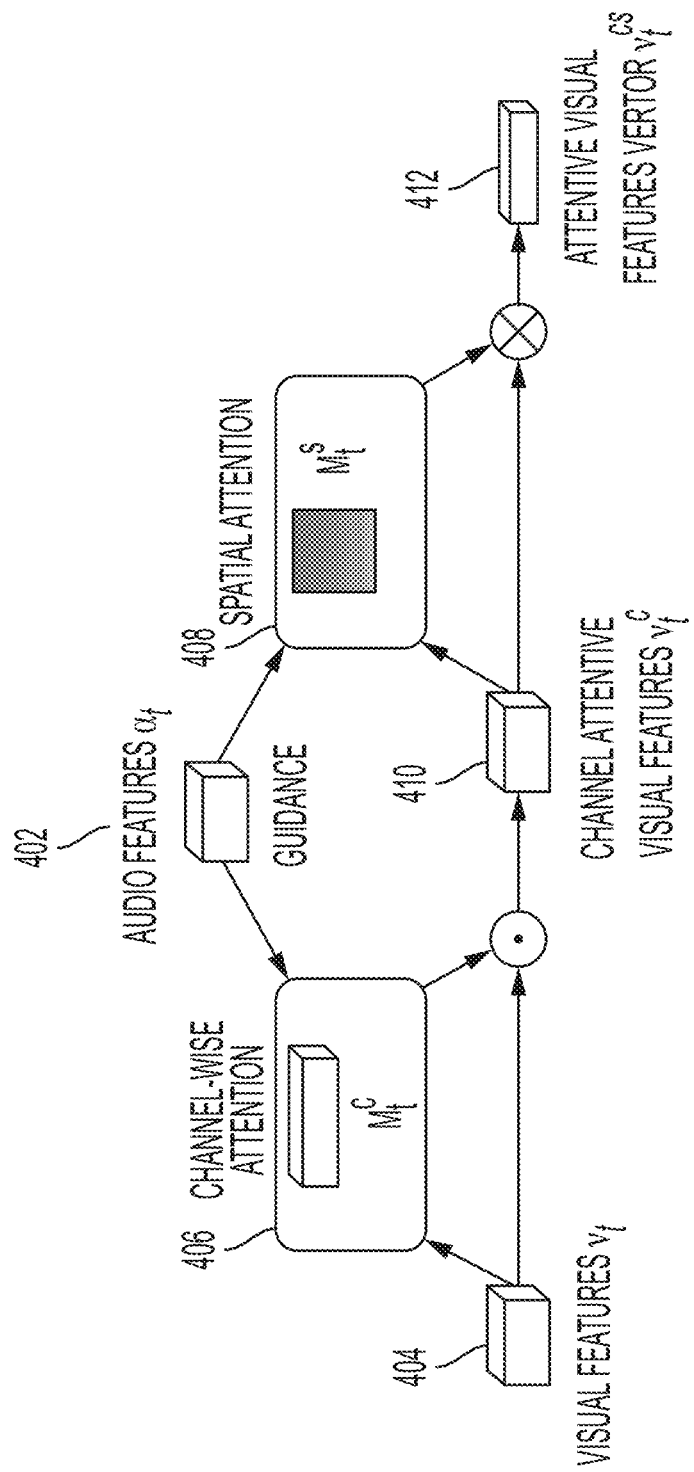
FIG. 4 illustrates an audio-guided spatial-channel attention (AGSCA) module in one embodiment.

FIG. 4 illustrates an audio-guided spatial-channel attention (AGSCA) module, for example, shown in FIG. 3 at 312, in one embodiment. AGSCA, in an embodiment, leverages the audio guidance capability to guide visual attention at channel level (left part) and spatial level (right part). Given audio features $a_t \in \mathbb{R}^{d_a}$ 402 and visual features $v_t \in \mathbb{R}^{d_v \times (H*W)}$ 404, where H and W are the height and width of feature maps respectively, AGSCA generates channel-wise attention maps $M_t^c \in \mathbb{R}^{d_v \times 1}$ 406 to adaptively emphasize informative features. AGSCA then produces spatial attention maps $M_t^s \in \mathbb{R}^{1 \times (H*W)}$ 408 for the channel attentive features 410 to highlight sounding regions, yielding channel spatial attentive visual features $v_t^{cs}$ 412. The attention process can be summarized as, $$v_t^{cs} = M_t^s \otimes (v_t^c)^T,$$

$$v_t^c = M_t^c \odot v_t \quad (1)$$

where $\otimes$ denotes matrix multiplication, and $\odot$ means element-wise multiplication.

The channel-wise attention 406 generates attention maps $M_t^c$ and spatial attention 408 produces attention maps $M_t^s$.

Channel-Wise Attention

A method and/or system, in an embodiment, models the dependencies between channels of features with the guidance of audio signals. In an embodiment, the method and/or system transforms transform audio and visual features into a common space using fully-connected layers with non-linearity, resulting in audio guidance maps $a_t^m \in \mathbb{R}^{d_v}$ and transformed visual features with dimensions of $d_v \times (H*W)$. In an embodiment, the method and/or system spatially squeezes the transformed visual features by global average pooling. The method and/or system then leverages the guidance information of $a_t^m$ by fusing visual features with $a_t^m$ via element-wise multiplication. The method and/or system forwards the fused visual features through two fully-connected layers with non-linearity to model the relationships between channels, yielding channel attention maps $M_t^c$. The details are shown as follows, in an embodiment:

$$M_t^c = \sigma(W_1 U_1^c((U_a^c a_t) \odot \delta_a(U_v^c v_t))) \quad (2)$$

where $U_a^c \in \mathbb{R}^{d_v \times d_a}$, $U_v^c \in \mathbb{R}^{d_v \times d_v}$ and $U_1^c \in \mathbb{R}^{d \times d_v}$ are fully-connected layers with rectified linear unit (ReLU) as an activation function, $W_1 \in \mathbb{R}^{d_v \times d}$ are learnable parameters with d=256 as a hidden dimension, $\delta a$ indicates global average pooling, and $\sigma$ denotes the sigmoid function.

Spatial Attention

The method and/or system also leverages the guidance capability of audio signals to guide visual spatial attention 408. Spatial attention 408 follows a similar pattern to the channel-wise attention 406. In an aspect, the input visual features $v_t^c$ 410 are channel attentive.

In an embodiment, the method and/or system formulates the process of spatial attention as follows:

$$M_t^s = \text{Softmax}(x_t^s)$$

$$x_t^s = \delta(W_2((U_a^s a_t) \odot (U_v^s v_t^c))), \quad (3)$$

where $U_a^s \in \mathbb{R}^{d \times d_a}$, $U_v^s \in \mathbb{R}^{d \times d_v}$, are fully-connected layers with ReLU as an activation function, $W_2 \in \mathbb{R}^{1 \times d}$ are learnable parameters with d=256 as a hidden dimension, and $\delta$ denotes the hyperbolic tangent function. With the spatial attention maps $M_t^s$, the method and/or system performs weighted summation over $v_t$ according to $M_t^s$ to highlight informative regions and shrink spatial dimensions, yielding a channel-spatial attentive visual feature vector $v_t^{cs} \in \mathbb{R}^{d_v}$ 412 as output.

Cross-Modality Relation Attention

Figure 5:
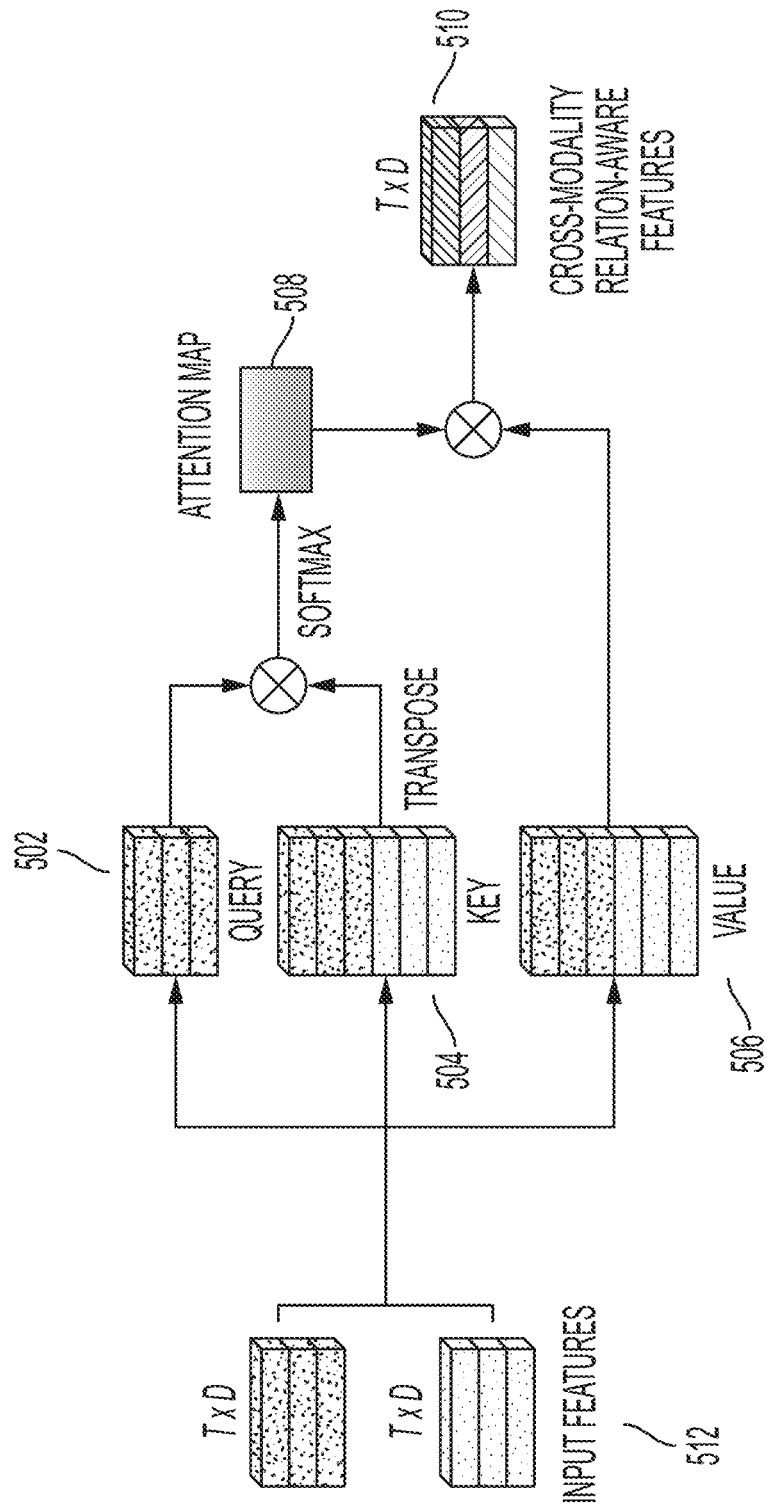
FIG. 5 shows a cross-modality relation attention (CMRA) mechanism in an embodiment.

Cross-modality relation attention, in an embodiment, is a component of a relation-aware module (e.g., shown in FIG. 3 at 318 and 320). Given visual and acoustic features, the method and/or system may exploit cross-modality relations to build a bridge between two modalities while not neglecting the intra-modality relation information. For this task, the method and/or system, in an embodiment, implements or provides a cross-modality relation attention (CMRA) mechanism. FIG. 5 shows a cross-modality relation attention (CMRA) mechanism in an embodiment. The bars in different shadings represent segment-level features from different modalities. CMRA simultaneously exploits the intra-modality and inter-modality relations for audio or video segment features, and enables to adaptively learn a balance between these two relations. A query 502 is derived from features of one modality (e.g., audio or video), denoted as $q_1$. For instance, input features can include audio and video features shown at 512. The key-value pairs 504, 506 are derived from features of two modalities (e.g., audio and video), and the method and/or system packs them into a key matrix $K_{1,2}$ and a value matrix $V_{1,2}$. In an embodiment, the method and/or system takes the dot-product operation as a pair-wise relation function. The method and/or system then calculates dot-products of $q_1$ with all keys $K_{1,2}$, divided each by the square root of their shared feature dimension dm and apply a softmax function to obtain attention weights of values $V_{1,2}$. The attended output 510 is calculated by the summation over all values $V_{1,2}$ weighted by the relations (i.e., attention weights) 508 learned from $q_1$ and $K_{1,2}$.

In an embodiment, CMRA is defined as:

$$CMRA(q_1, K_{1,2}, V_{1,2}) = \text{Softmax}\left(\frac{q_1 (K_{1,2})^T}{\sqrt{d_m}}\right) V_{1,2}, \quad (4)$$

where index 1 or 2 represents different modalities. Since $q_1$ comes from audio or visual features while $K_{1,2}$ and $V_{1,2}$ come from both audio and visual features, CMRA enables the adaptive learning of both intra-modality and inter-modality relations, along with a balance between them. An individual segment from a modality in the video sequence enables to obtain useful information from all related segments of two modalities based on the learned relations, which facilitates the audio-visual representation learning and further boosts the performance of AVE localization.

The following illustrates an example of a concrete instance of CMRA in AVE localization. Without loss of generality, the following description takes visual features as the query for illustration purposes. Given the audio features $a = [a_1, \ldots, a_T] \in \mathbb{R}^{T \times d_m}$ and visual features $v = [v_1, \ldots, v_T] \in \mathbb{R}^{T \times d_m}$ the method and/or system projects v into the query features, denoted as $F_{a,v}^K \in \mathbb{R}^{T \times d_m}$ with a linear transformation. The method and/or system then temporally concatenate v with a to obtain a raw memory base $m_{a,v} \in \mathbb{R}^{2 \ast T \times d_m}$. Afterwards, the method and/or system linearly transforms $m_{a,v}$ into key features $F_{a,v}^K \in \mathbb{R}^{2 \ast T \times d_m}$ and value features $F_{a,v}^V \in \mathbb{R}^{2 \ast T \times d_m}$ A cross-modality attentive output $v_q$ is calculated as $$v_q = \text{Softmax}\left(\frac{F_v^Q (F_{a,v}^K)^T}{\sqrt{d_m}}\right) F_{a,v}^V, \quad (5)$$

$$F_v^Q = vW^Q,$$

$$F_{a,v}^K = m_{a,v} W^K,$$

$$F_{a,v}^V = m_{a,v} W^V,$$

$$m_{a,v} = \text{Concat}(a, v),$$

where $W^Q$, $W^K$, $W^V$ are learnable parameters with dimensions of $d_m \times d_m$. While in this example, visual features v are taken as the query for illustration purposes, it is noted that audio features can be taken as the query to exploit relations for audio features. In comparison, self-attention can be regarded as a special case of CMRA when the memory contains only the same modality features as the query. In an embodiment, CMRA can be implemented in a relation-aware module described below.

Relation-Aware Module

In an embodiment, a relation-aware module (e.g., shown in FIG. 3 at 318 and 320) involves a cross-modality relation module and an internal temporal relation block, denoted as $M_{cmra}$ and $B_{self}$, respectively. FIG. 2 also shows an example of a cross-modality relation module at 218 and 220 and an internal temporal relation block at 214 and 216 (also referred to as intra-modality relation block). In an embodiment, the module $M_{cmra}$ contains the cross-modality relation attention mechanism (CMRA) to exploit relations. $B_{self}$ serves as an assistant of $M_{cmra}$. In an embodiment, the video/audio relation-aware module in example architecture is a relation-aware module that takes visual or audio features as the query in the CMRA operation.

For illustration purposes, visual features $v \in \mathbb{R}^{T \times d_v}$ from the AGSCA module are taken as a query (e.g., video relation-aware module shown in FIG. 3 at 318). Given visual features v to be a query, and audio features $a \in \mathbb{R}^{T \times d_a}$ to be a part of memory, the method and/or system transforms them into a common space via linear layers. As an example, the transformed visual and audio features are denoted as $F_v$ and $F_a$, respectively, with the same dimensions of $T \times d_m$. Then, $B_{self}$ takes as input $F_a$ to explore internal temporal relations in advance, yielding self-attentive audio features denoted as $F_a^s$. $M_{cmra}$ takes as input $F_v$ and $F_a^s$, to explore intra-modality relations and inter-modality relations for visual features with the help of CMRA, and yields relation-aware visual features $v_o$ (e.g., shown in FIG. 3 at 322) as output. The overall process can be summarized as $$v_0 = M_{crma}(F_v, F_a^s),$$

$$F_a^s = B_{self}(F_a),$$

$$F_a = aW_a, F_v = vW_v, \quad (6)$$

where $W_a \in \mathbb{R}^{d_a \times d_m}$ and $W_v \in \mathbb{R}^{d_v \times d_m}$ are learnable parameters.

Cross-Modality Relation Module.

In an embodiment, using the CMRA operation, cross-modality relation module $M_{cmra}$ serves to exploit inter-modality relations along with intra-modality relations. In an embodiment, the method and/or system performs CMRA in a multihead setting as $$H = \text{Concat}(h_1, \ldots h_n) W_h,$$

$$h_i = CMRA(F_v W_i^Q, (F_v \| F_a^s) W_i^K, (F_v \| F_a^s) W_i^V), \quad (7)$$

where ∥ denotes the temporal concatenation operation, $W_i^Q$, $W_i^K$, $W_i^V$, $W_h$ are parameters to be learned, and n denotes the number of parallel CMRA modules. To avoid the transmission loss from CMRA, the method and/or system can add $F_v$ as a residual connection into H along with a layer normalization as $$Hr = \text{LayerNorm}(H + F_v). \tag{8}$$

To further fuse the information from several parallel CMRA operations, the method and/or system forwards $H_r$ through two linear layers with a ReLU. In an embodiment, the detailed calculation of output $v_o$ can be given as $$v_o = \text{LayerNorm}(O_f + H_r),$$

$$O_f = \delta(H_r W_3) W_4, \tag{9}$$

where $\delta$ denotes the ReLU function, and $W_3$ and $W_4$ are learnable parameters of two linear layers.

Internal Temporal Relation Block

In an embodiment, the method and/or system replaces CMRA with self-attention in $M_{cmra}$ to obtain an internal temporal relation block $B_{self}$. The block $B_{self}$ concentrates on exploring the internal temporal relation for a portion of memory features in advance to assist in $M_{cmra}$.

Audio-Video Interaction Module

Relation-aware modules output cross-modal relation-aware visual and acoustic representations, denoted as $v_0 \in \mathbb{R}^{T \times d_m}$ and $a_0 \in \mathbb{R}^{T \times d_a}$, respectively, for example, shown in FIG. 2 at 222, 224, and also shown in FIG. 3 at 322, 324. In an embodiment, an audio-video interaction module obtains a comprehensive representation of two modalities for one or more classifiers. In an embodiment, the audio-video interaction module seeks to capture the resonance between visual and acoustic channels by incorporating $v_0$ with $a_0$.

In an embodiment, the method and/or system fuses $v_o$ and $a_o$ with element-wise multiplication to obtain a joint representation of these two modalities, denoted as $f_{av}$. The method and/or system then leverages $f_{av}$ to attend to the visual representation vo and acoustic representation $a_o$, where $v_o$ and $a_o$ separately supply visual and acoustic information for better visual understanding and acoustic perception. This operation can be regarded as a variant of CMRA, where the query is a fusion of the memory features. The method and/or system then adds a residual connection and a layer normalization to the attentive output, similar to the relation-aware module.

In an embodiment, a comprehensive dual-modality representation $O_{av}$ is calculated as follows:

$$O_{av} = \text{LayerNorm}(O + f_{av}),$$

$$O = \text{CMRA}(f_{av}, W_{a,v}^Q, m W_{a,v}^K, m W_{a,v}^V),$$

$$f_{av} = a_0 \odot v_0, \tag{10}$$

where $\odot$ denotes element-wise multiplication, and $W_{a,v}^Q$, $W_{a,v}^K$, $W_{a,v}^V$ are parameters to be learned.

Supervised and Weakly-Supervised Audio-Visual Event Localization

Supervised Localization

In an embodiment, the audio-video interaction module (e.g., shown in FIG. 2 at 226, and also shown in FIG. 3 at 336), obtains features $O_{av}$ with dimensions of $T \times d_m$. In an embodiment, the method and/or system decomposes the localization into predicting two scores. One is the confidence score $\hat{s}_t$ that determines whether an audiovisual event exists in the t-th video segment. The other one is an event category score $\hat{s}_c \in \mathbb{R}^C$ where C denotes the number of the foreground categories. Confidence scores $\hat{s} = [\hat{s}_1, \ldots, \hat{s}_T] \in \mathbb{R}^T$ are calculated as $$\hat{s} = \sigma(O_{av} W_s), \tag{11}$$

where $W_s$ are learnable parameters, and $\sigma$ denotes the sigmoid function. For the category score $\hat{s}_c$, the method and/or system in an embodiment conducts max-pooling on the fused features $O_{av}$, yielding a feature vector $o_{av} \in \mathbb{R}^{1 \times d_m}$.

An event category classifier (e.g., shown in FIG. 3 at 330) takes as input $o_{av}$ to predict an event category score $\hat{s}_c$:

$$\hat{s}_c = \text{Softmax}(O_{av} W_c), \tag{12}$$

where $W_c$ is a parameter matrix to be learned.

During the inference phase, the final prediction is determined by $\hat{s}$ and $\hat{s}_c$. If $\hat{s}_t \geq 0.5$, the t-th segment is predicted to be event-relevant, with an event category according to $\hat{s}_c$. If $\hat{s}_t < 0.5$, the t-th segment is predicted as background.

In the training, the system and/or method can have the segment-level labels, including event-relevant labels and event-category labels. The overall objective function is a summation of a cross-entropy loss for event classification and a binary cross-entropy loss for event-relevant prediction.

Weakly-Supervised Localization

In the weakly-supervised manner, the method and/or system can also predict $\hat{s}$ and $\hat{s}_c$ as described above. In an aspect, since the method and/or system may only have access to the video-level labels, the method and/or system may duplicate $\hat{s}_c$ for T times and $\hat{s}$ for C times, and then fuse them via element-wise multiplication, yielding joint scores $\hat{s}_f \in \mathbb{R}^{T \times C}$. In an embodiment, the method and/or system may formulate this problem as an multiple instance learning (MIL) problem and aggregate segment-level predictions $\hat{s}_f$ to obtain a video-level prediction via MIL pooling during training. During inference, in an embodiment, the prediction process can be the same as that of the supervised task.

By way of example, training settings may include setting the hidden dimension dm in the relation-aware module as 256. For CMRA and self-attention in relation-aware modules, the system and/or method may set the number of parallel heads as 4. The batch size is 32. As an example, the method and/or system may apply Adam as an optimizer to update weights of a neural network iteratively based on training data. As an example, the method and/or system may set the initial learning as $5 \times 10^{-4}$ and gradually decay it by multiplying by 0.5 at epochs 10, 20 and 30. Another optimizer can be used.

Figure 6:
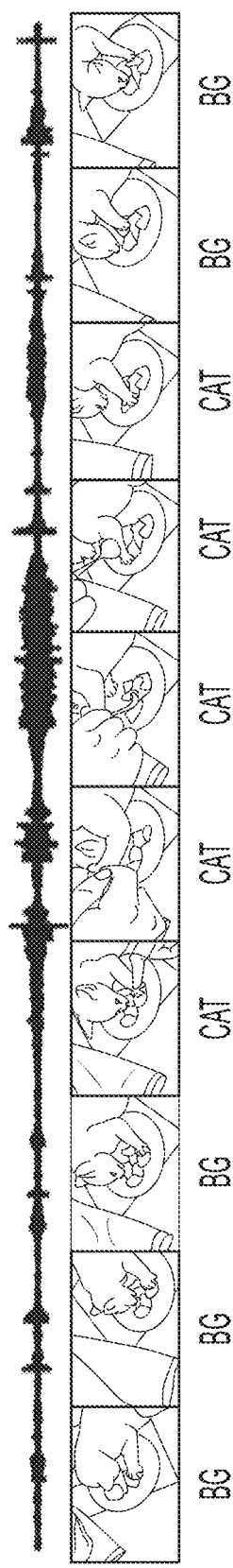
FIG. 6 shows an example localization result output by the method and/or system in an embodiment.

FIG. 6 shows an example localization result output by the method and/or system in an embodiment. The method and/or system correctly predicts the event category for each segment, (e.g., as background (BG) or cat screaming) and thus precisely localizes the cat screaming event.

Figure 7:
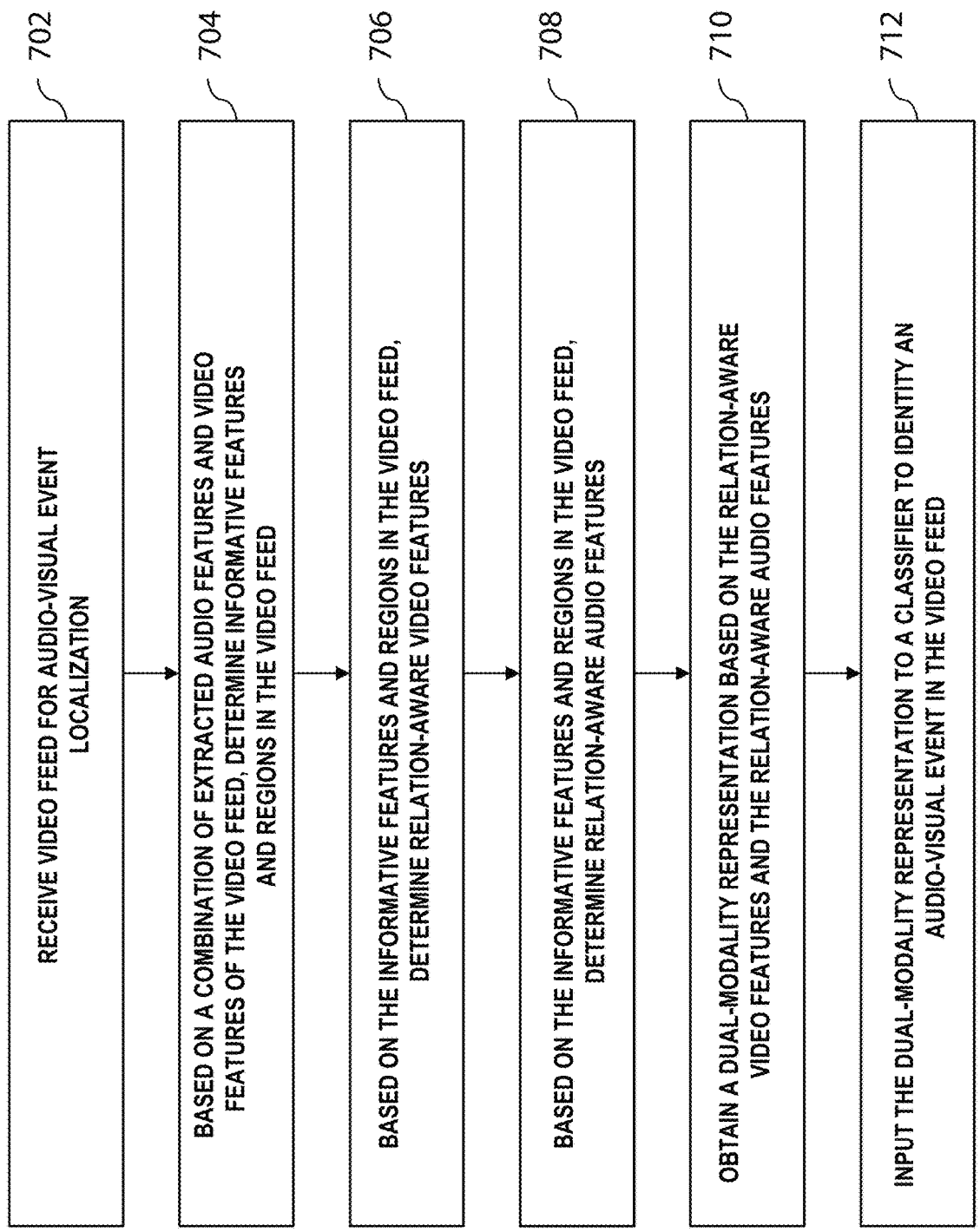
FIG. 7 is a flow diagram illustrating a method for audio-visual event localization in an embodiment.

FIG. 7 is a flow diagram illustrating a method for audio-visual event localization in an embodiment. A dual-modality relation network as described herein, in embodiments, can perform localization of an audio-visual event. The method can be run or executed by or on one or more processors such as hardware processors. At 702, the method includes receiving a video feed for audio-visual event localization. At 704, the method includes, based on a combination of extracted audio features and video features of the video feed, determining informative features and regions in the video feed by running a first neural network. For example, an audio-guided visual attention module, which can include the first neural network, can be run.

At 706, the method includes, based on the informative features and regions in the video feed determined by the first neural network, the method can include determining relation-aware video features by running a second neural network. At 708, based on the informative features and regions in the video feed determined by the first neural network, the method can include determining relation-aware audio features by running a third neural network. For example, intra-modality and inter-modality modules (e.g., described above with reference to 214, 216, 218 and 220 in FIG. 2) can be implemented and/or run. In embodiments, the second neural network takes both temporal information in the video features and cross-modality information between the video features and the audio features in determining the relation-aware video features. In embodiments, the third neural network takes both temporal information in the audio features and cross-modality information between the video features and the audio features in determining the relation-aware audio features.

At 710, the method includes, obtaining a dual-modality representation based on the relation-aware video features and the relation-aware audio features by running a fourth neural network. For example, an audio-video interaction module (e.g., described above with reference to 226) can be implemented and/or run.

At 712, the method includes, inputting the dual-modality representation to a classifier to identity an audio-visual event in the video feed. In an embodiment, the dual-modality representation is used as a last layer of the classifier in identifying the audio-visual event. The classifier identifying the audio-visual event in the video feed can include identifying a location in the video feed where the audio-visual event is occurring and a category of the audio-visual event.

In an embodiment, a convolutional neural network (e.g., referred to as a first convolutional neural network for explanation) can be run with at least a video portion of the video feed to extract the video features. In an embodiment, a convolutional neural network (e.g., referred to as a second convolution neural network for explanation) can be run with at least an audio portion of the video feed to extract the audio features.

Figure 8:
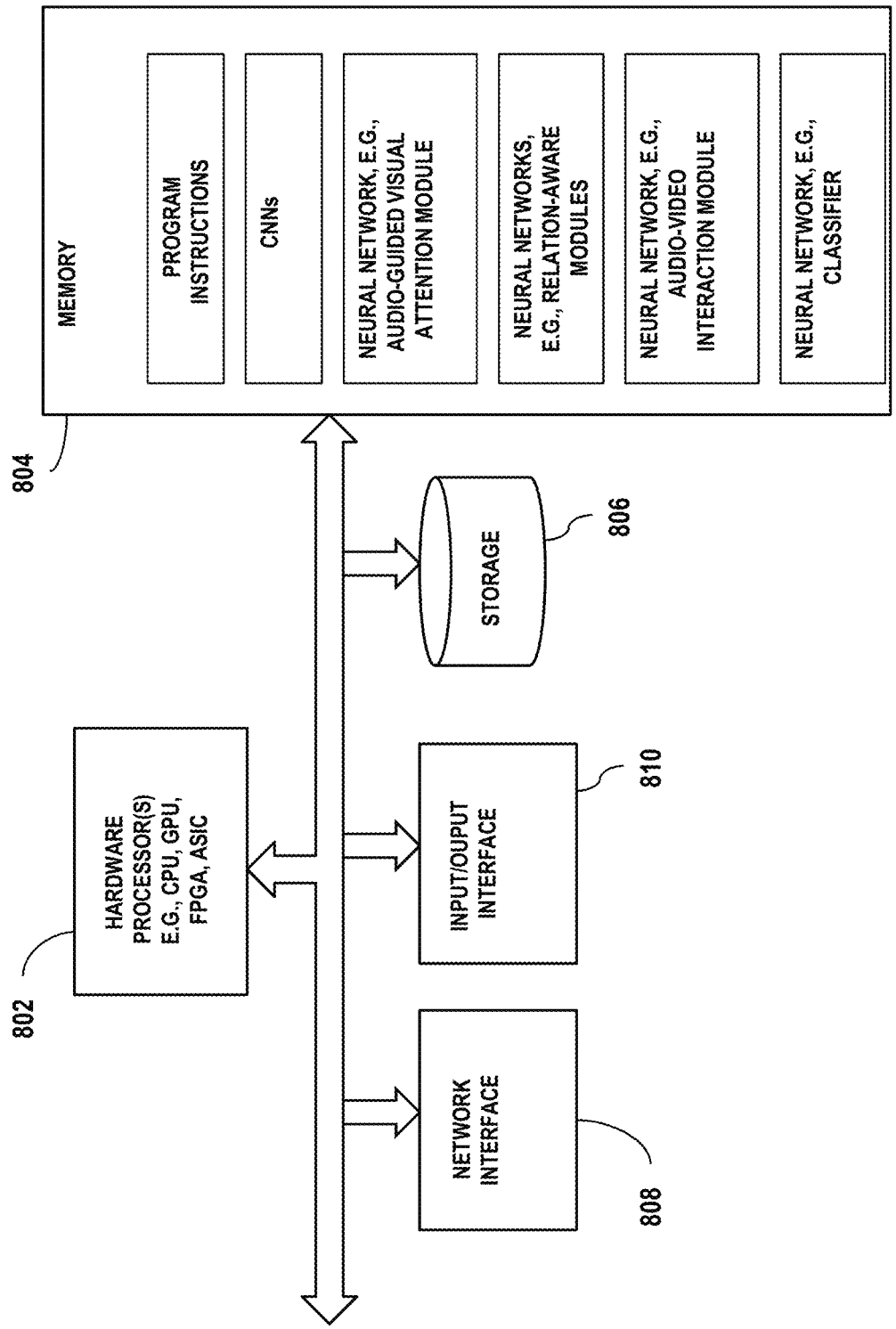
FIG. 8 is a diagram showing components of a system in one embodiment that can implement dual-modality relation networks for audio-visual event localization.

FIG. 8 is a diagram showing components of a system in one embodiment that can implement dual-modality relation networks for audio-visual event localization. One or more hardware processors 802 such as a central processing unit (CPU), a graphic process unit (GPU), and/or a Field Programmable Gate Array (FPGA), an application specific integrated circuit (ASIC), and/or another processor, may be coupled with a memory device 804, implement dual-modality relation networks and perform audio-visual event localization. A memory device 804 may include random access memory (RAM), read-only memory (ROM) or another memory device, and may store data and/or processor instructions for implementing various functionalities associated with the methods and/or systems described herein. One or more processors 802 may execute computer instructions stored in memory 804 or received from another computer device or medium. A memory device 804 may, for example, store instructions and/or data for functioning of one or more hardware processors 802, and may include an operating system and other program of instructions and/or data. One or more hardware processors 802 may receive input comprising a video feed, e.g., from which video and audio features can be extracted. For instance, at least one hardware processor 802 may perform audio-visual event localization, using methods and techniques described herein. In one aspect, data such as input data and/or intermediary data may be stored in a storage device 806 or received via a network interface 808 from a remote device, and may be temporarily loaded into a memory device 804 for implementing the dual-modality relation networks and performing audio-visual event localization. The learned models such as neural network models in the dual-modality relation networks can be stored on a memory device 804, for example, for execution by one or more hardware processors 802. One or more hardware processors 802 may be coupled with interface devices such as a network interface 808 for communicating with remote systems, for example, via a network, and an input/output interface 810 for communicating with input and/or output devices such as a keyboard, mouse, display, and/or others.

Figure 9:
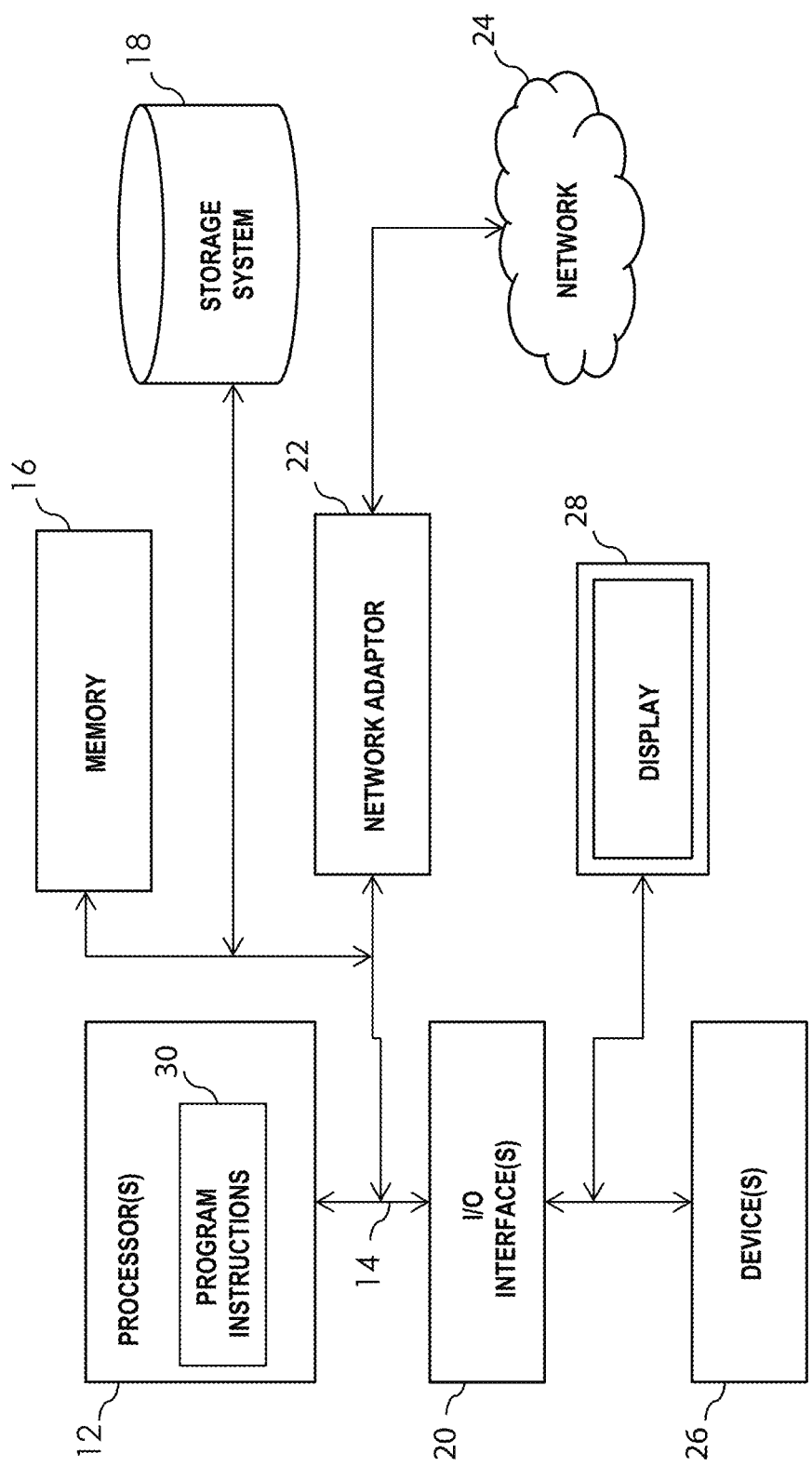
FIG. 9 illustrates a schematic of an example computer or processing system that may implement a dual-modality relations networks system in one embodiment.

FIG. 9 illustrates a schematic of an example computer or processing system that may implement a dual-modality relations networks system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more modules 30 that perform the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
    a hardware processor;
    a memory coupled with the hardware processor;
    the hardware processor configured to:
        receive a video feed for audio-visual event localization;
        based on a combination of extracted audio features and video features of the video feed, determine informative features and regions in the video feed by running a first neural network;
        based on the informative features and regions in the video feed determined by the first neural network, determine relation-aware video features by running a second neural network, the second neural network configured to implement cross-modality relation attention mechanism and learn the relation-aware video features using at least one query derived from a video feature and key-value pairs derived from both video and audio features associated with the video feed;
        based on the informative features and regions in the video feed determined by the first neural network, determine relation-aware audio features by running a third neural network, the third neural network configured to implement cross-modality relation attention mechanism and learn the relation-aware audio features using at least one query derived from an audio feature and the key-value pairs derived from both video and audio features associated with the video feed;
        obtain a dual-modality representation based on the relation-aware video features and the relation-aware audio features by running a fourth neural network;
        input the dual-modality representation to a classifier to identity an audio-visual event in the video feed,
        wherein, in the cross-modality relation attention mechanism, the at least one query $q_1$ used in attention mechanism is derived from one modality while the keys $K_{1,2}$ and values $V_{1,2}$ used in attention mechanism are derived from two modalities in the cross-modality relation attention,
        dot-products of $q_1$ with all keys $K_{1,2}$ are computed, divided each by the square root of shared feature dimension dm and a softmax function applied to obtain attention weights of values $V_{1,2}$, wherein attended output is computed by a summation over all values $V_{1,2}$ weighted by the attention weights representing relations learned from $q_1$ and $K_{1,2}$,
        wherein an individual segment from a modality aggregates useful information from all related segments from two modalities simultaneously.

2. The system of claim 1, wherein the hardware processor is further configured to run a first convolutional neural network with at least a video portion of the video feed to extract the video features.

3. The system of claim 1, wherein the hardware processor is further configured to run a second convolution neural network with at least an audio portion of the video feed to extract the audio features.

4. The system of claim 1, wherein the dual-modality representation is used as a last layer of the classifier in identifying the audio-visual event.

5. The system of claim 1, wherein the classifier identifying the audio-visual event in the video feed includes identifying a location in the video feed where the audio-visual event is occurring and a category of the audio-visual event.

6. The system of claim 1, wherein the second neural network takes both temporal information in the video features and cross-modality information between the video features and the audio features in determining the relation-aware video features.

7. The system of claim 1, wherein the third neural network takes both temporal information in the audio features and cross-modality information between the video features and the audio features in determining the relation-aware audio features.

8. A computer-implemented method comprising:
receiving a video feed for audio-visual event localization;
based on a combination of extracted audio features and video features of the video feed, determining informative features and regions in the video feed by running a first neural network;
based on the informative features and regions in the video feed determined by the first neural network, determining relation-aware video features by running a second neural network, the second neural network configured to implement cross-modality relation attention mechanism and learn the relation-aware video features using at least one query derived from a video feature and key-value pairs derived from both video and audio features associated with the video feed;
based on the informative features and regions in the video feed determined by the first neural network, determining relation-aware audio features by running a third neural network, the third neural network configured to implement cross-modality relation attention mechanism and learn the relation-aware audio features using at least one query derived from an audio feature and the key-value pairs derived from both video and audio features associated with the video feed;
obtaining a dual-modality representation based on the relation-aware video features and the relation-aware audio features by running a fourth neural network;
inputting the dual-modality representation to a classifier to identity an audio-visual event in the video feed,
wherein, in the cross-modality relation attention mechanism, the at least one query $q_1$ used in attention mechanism is derived from one modality while the keys $K_{1,2}$ and values $V_{1,2}$ used in attention mechanism are derived from two modalities in the cross-modality relation attention,
dot-products of $q_1$ with all keys $K_{1,2}$ are computed, divided each by the square root of shared feature dimension dm and a softmax function applied to obtain attention weights of values $V_{1,2}$, wherein attended output is computed by a summation over all values $V_{1,2}$ weighted by the attention weights representing relations learned from $q_1$ and $K_{1,2}$,
wherein an individual segment from a modality aggregates useful information from all related segments from two modalities simultaneously.

9. The method of claim 8, further comprising running a first convolutional neural network with at least a video portion of the video feed to extract the video features.

10. The method of claim 8, further comprising running a second convolution neural network with at least an audio portion of the video feed to extract the audio features.

11. The method of claim 8, wherein the dual-modality representation is used as a last layer of the classifier in identifying the audio-visual event.

12. The method of claim 8, wherein the classifier identifying the audio-visual event in the video feed includes identifying a location in the video feed where the audio-visual event is occurring and a category of the audio-visual event.

13. The method of claim 8, wherein the second neural network takes both temporal information in the video features and cross-modality information between the video features and the audio features in determining the relation-aware video features.

14. The method of claim 8, wherein the third neural network takes both temporal information in the audio features and cross-modality information between the video features and the audio features in determining the relation-aware audio features.

15. A computer program product comprising a computer readable storage medium having program instructions embodied therewith, the program instructions readable/executable by a device to cause the device to:
receive a video feed for audio-visual event localization;
based on a combination of extracted audio features and video features of the video feed, determine informative features and regions in the video feed by running a first neural network;
based on the informative features and regions in the video feed determined by the first neural network, determine relation-aware video features by running a second neural network, the second neural network configured to implement cross-modality relation attention mechanism and learn the relation-aware video features using at least one query derived from a video feature and key-value pairs derived from both video and audio features associated with the video feed;
based on the informative features and regions in the video feed determined by the first neural network, determine relation-aware audio features by running a third neural network, the third neural network configured to implement cross-modality relation attention mechanism and learn the relation-aware audio features using at least one query derived from an audio feature and the key-value pairs derived from both video and audio features associated with the video feed;
obtain a dual-modality representation based on the relation-aware video features and the relation-aware audio features by running a fourth neural network; and
input the dual-modality representation to a classifier to identity an audio-visual event in the video feed,
wherein, in the cross-modality relation attention mechanism, the at least one query $q_1$ used in attention mechanism is derived from one modality while the keys $K_{1,2}$ and values $V_{1,2}$ used in attention mechanism are derived from two modalities in the cross-modality relation attention,
dot-products of $q_1$ with all keys $K_{1,2}$ are computed, divided each by the square root of shared feature dimension dm and a softmax function applied to obtain attention weights of values $V_{1,2}$, wherein attended output is computed by a summation over all values $V_{1,2}$ weighted by the attention weights representing relations learned from $q_1$ and $K_{1,2}$, wherein an individual segment from a modality aggregates useful information from all related segments from two modalities simultaneously.

16. The computer program product of claim 15, wherein the device is further caused to run a first convolutional neural network with at least a video portion of the video feed to extract the video features.

17. The computer program product of claim 15, wherein the device is further caused to run a second convolution neural network with at least an audio portion of the video feed to extract the audio features.

18. The computer program product of claim 15, wherein the dual-modality representation is used as a last layer of the classifier in identifying the audio-visual event.

19. The computer program product of claim 15, wherein the classifier identifying the audio-visual event in the video feed includes identifying a location in the video feed where the audio-visual event is occurring and a category of the audio-visual event.

20. The computer program product of claim 15, wherein the second neural network takes both temporal information in the video features and cross-modality information between the video features and the audio features in determining the relation-aware video features, and the third neural network takes both temporal information in the audio features and the cross-modality information between the video features and the audio features in determining the relation-aware audio features.

\* \* \* \* \*